United States Patent [19]

Kubo et al.

[11] Patent Number: 4,978,158

[45] Date of Patent: Dec. 18, 1990

[54] VEHICLE SEAT

[75] Inventors: Yoshiaki Kubo; Sinichi Toya, both of Akishima, Japan

[73] Assignee: Tachi-S Co., Ltd., Akishma, Japan

[21] Appl. No.: 426,107

[22] Filed: Oct. 24, 1989

[30] Foreign Application Priority Data

Sep. 26, 1988 [JP] Japan .......................... 63-125266[U]

[51] Int. Cl.⁵ .............................................. B60N 1/02
[52] U.S. Cl. ...................................... 296/65.1; 297/15
[58] Field of Search ................ 296/65.1, 63; 248/503, 248/503.1; 297/15

[56] References Cited

U.S. PATENT DOCUMENTS 4,273,376  6/1981  Duguet et al. ..................... 296/65.1
4,759,580  7/1988  Berklich, Jr. ...................... 296/65.1
4,805,952  2/1989  Coleman ............................ 296/65.1
4,865,377  9/1989  Musser et al. ..................... 296/65.1

Primary Examiner—Robert R. Song
Attorney, Agent, or Firm—Oldham & Oldham Co.

[57] ABSTRACT

A vehicle seat of a detachable type including a support bracket with a lock means, a connecting rod which is rotatably provided at the support bracket and fixed with the lock means, and a base bracket fixed on the floor of vehicle. The connecting rod is formed with a crank-like handle portion and the lock means is for locking or unlocking the seat to or from the base bracket. Hence, an operator has only to grip in his or her one hand the crank-like handle portion and lift it up, rotating the same, for removing the seat from the base bracket.

4 Claims, 3 Drawing Sheets

VEHICLE SEAT

BACKGROUND OF THE INVENTION

1. Field of the Invention

The present invention relates to a vehicle seat, such as an automotive seat, and in particular, relates to a detachable type of seat used in a load-carrying area of the vehicle, where either luggage or occupant is to be accommodated, as required, wherein the seat may be removed the vehicle floor for allowing a luggage to be placed on the floor, or may remain mounted on the floor for enabling an occupant to sit on the seat.

2. Description of Prior Art

Typically, a hitherto detachable-type seat, which is used in the load-carrying area of vehicle, is constructed as shown in FIGS. 1(A) and 1(B).

According to this prior art, a pair of support brackets (12)(13) are fixed on the lower surface of a seat cushion (11) such that they are each disposed on both sides of and forwardly of the seat cushion (11), and provided rotatably to the respective two support brackets (12)(13), are each a pair of lock members (14)(15) via a connecting rod (16) which extends between the two support brackets (13)(14), with both ends of the connecting rod (16) being each rotatably supported through the respective two support brackets (13)(14). The lock members (14)(15) are fixed on the connecting rod (16) and one end of the connecting rod (16) is fixedly connected with an operation lever (17), so that the vertical rotation of the lever (17) results in the simultaneous likewise rotations of the two lock members (14)(15). As shown, those lock members (14)(15) have notched latch parts, respectively, which are to receive the corresponding support pins (18a)(19a) respectively of two base brackets (18)(19) fixed on the floor (F) of the vehicle.

The support brackets (12)(13) are resspectively formed with engagement recesses (12a)(13a) in which the support pins (18a)(19a) are respectively to engage.

Thus, from FIG. 1, wherein seat cushion (11) is shown as being attached to the floor (F), it is seen that the notched latch parts of the lock members (14)(15) and engagement recesses (12a)(13a) of the support brackets (12)(13) cooperate to encircle therein the respective support pins (18a)(19a) of the base brackets (18)(19), thereby locking the attachment of the seat cushion (11) to the base brackets (18)(19).

On the other hand, as in FIG. 2, to remove the seat cushion (11) from the base brackets (18)(19), rotating the lever (17) downwardly cuases upward rotation of the lock members (14)(15) to thereby open the engagement recesses (12a)(13a), allowing the the seat cushion (11) to be taken out, with the support pins (18a)(19a) being passed from the engagement recesses (12a)(13a).

However, the prior art has been found disadvantageous in that the process of removing the seat cushion (11) involves such annoying, troublesome steps wherein an operator has to use his both hands differently; namely, us e his one hand to turn the lever (17) while using his other hand to lift up the seat cushion (11), and then turn the removed seat cushion (11) to an easy-to-hold state, requiring an unexpected hard labor on the operator's side. In addition, the projection of the lever (17) laterally of the seat will be easily subject to a bump and clash against or capture in other objects, damaging itself or the objects, and further, because of that, there is a high likelihood of the lever (17) being accidentally turned to release the locked state of the seat cushion (11), causing the separation thereof from the floor and throwing an occupant thereon into an undesired injury.

SUMMARY OF THE INVENTION

In view of the foregoing drawbacks, it is therefore a purpose of the present invention to provide an improved vehicle seat which may be easily removed from the floor of vehicle and is simplified structurally.

In achievement of the purpose, in accordance with the invention, a pair of support brackets, each having an engagement recess formed therein, are fixed to the reverse side of a seat cushion, a pair of lock members, each being formed with a latch hook part, are provided inwardly of the support bracket and a connecting rod extends between the two support brackets such that both ends of the connecting rod are rotatably supported at the respective two support brackets, and :hat the two lock members are fixed on the connecting rod for simultaneous rotation with the latter. Normally, the engagement recesses of the support brackets and latch hook parts of the lock members are closed with each other to encircle the support pins of two base brackets which are fixed on the floor of vehicle, thus placing the seat cushion in a locked state against the floor. The connecting rod is at its intermediate part formed with a crank-like handle portion.

Accordingly, to remove the seat back from the base brackets on the floor, the handle portion of the connecting rod is held by one hand of an operator and then drawn, causing rotation of the connecting rod, which in turn causes the upward rotation of the lock members away from the engagement recesses of the support backet, thereby opening them, with the result that , as the seat back is being lifted up, the support pins of the base brackets are passed from the opened engagement recesses of the support bracket, and the seat cushion are thus easily removed by simply drawing the handle protion of the connecting rod with one hand. It is appreciated that the seat cushion thus removed may be carried in one hand, like a bag, and attached back into the base brackets with one hand.

DETAILED DESCRIPTION OF PREFERRED EMBODIMENT OF THE INVENTION

Figure 1A:
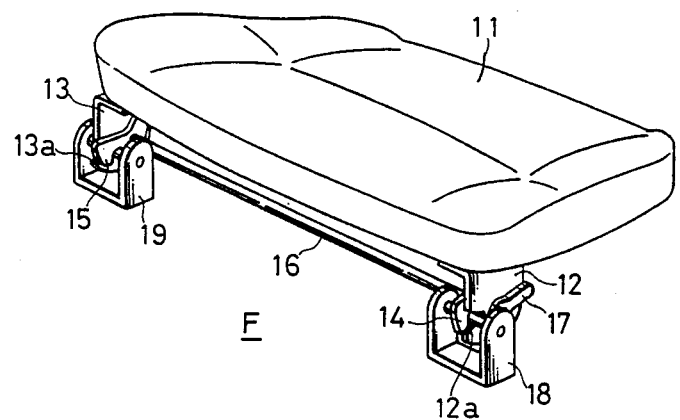
FIG. 1(A) is a perspective view of a conventional vehicle seat, showing the state wherein the seat is attached to base brackets on the floor.
Figure 1B:
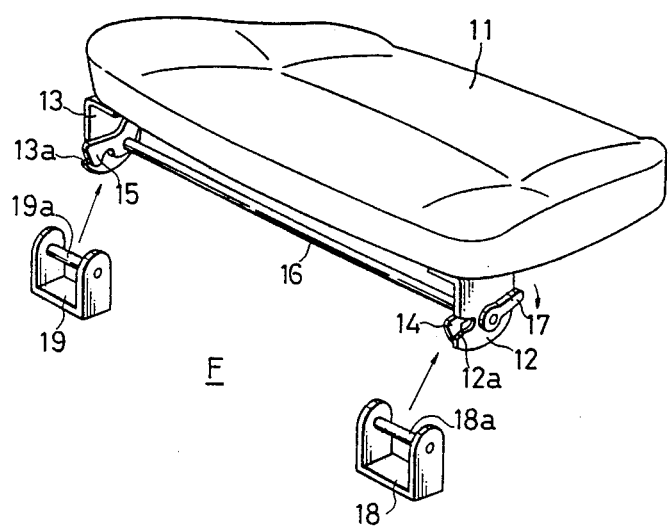
FIG. 1(B) is a perspective view of the conventional seat, showing the state wherein the seat is removed from the base brackets.

Referring to FIGS. 2 through 5, illustrative is a most preferred embodiment of the present invention wherein, similarly to the aforementioned prior art, a pair of spaced-apart support brackets (2)(3) are fixed on the reverse side of a seat cushion (1), such that they are disposed on the opposite sides of and forwardly of the seat cushion (1). Each of the support brackets (2)(3) has a notched engagement recess (2a, 3a) formed at its forward vertical edge.

On the floor (F) of a vehicle (not shown), are fixed a pair of spaced-apart base brackets (8)(9) such that each of them is disposed at a point corresponding generally to that of the respective two support brackets (2)(3). The two base brackets (8)(9) are respectively provided with support pins (8a)(9a) at their upper portions, as shown.

Figure 3:
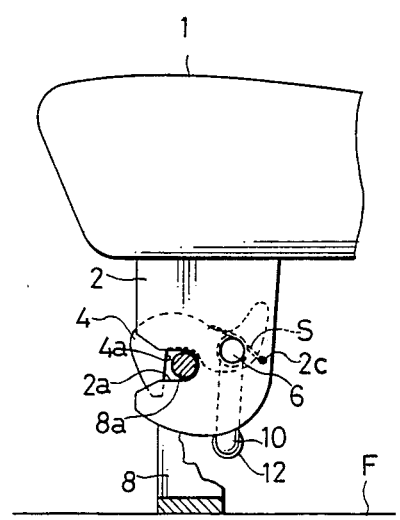
FIG. 3 is a partially broken, enlarged side view of a principal part of the present invention.
Figure 4:
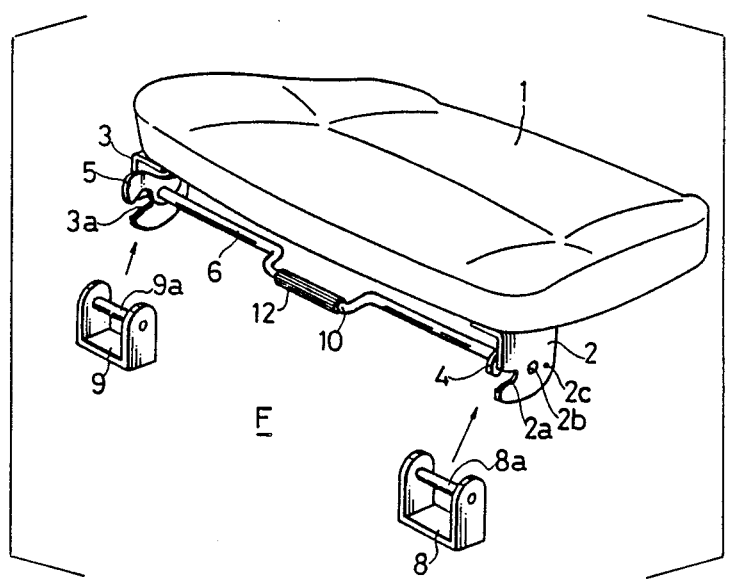
FIG. 4 is a perspective view of the seat in accordance with the invention, which shows the state wherein the seat is removed from the base brackets.

Inwardly of the respective two support brackets (2)(3), there are provided a pair of lock members (4)(5) in a vertically rotatable manner via a connecting rod (6). Specifically, the lock members (4)(5) are formed in a "S"-shaped configuration, as best seen in FIG. 3, and are fixed on the connecting rod (6) at their respective rearward base areas; in other words, both end parts of the connecting rod (6) passes through those respective rearward base areas in a fixed manner and further are rotatably supported in the securing holes (2b)(3b) of the support brackets (2)(3), whereby the rotation of the connecting rod (6) leads to the simultaneous rotation of both two lock members (4)(5). The lock members (4)(5), respectively, are formed at their forward portions with latch hook parts (4a)(5a) which are to receive the respective both end portions of the connecting rod (6), as will be discussed later. Likewise, the notched engagement recesses (2a)(3a) of the support brackets (2)(3) are to receive therein the end portions of the connecting rod (6).

The connecting rod (6) is formed at its intermediate part with a crank-like handle portion (10), around which is secured a slippage-preventive tubular cover element (12), which is preferably made of a rubber or the like.

Figure 5:
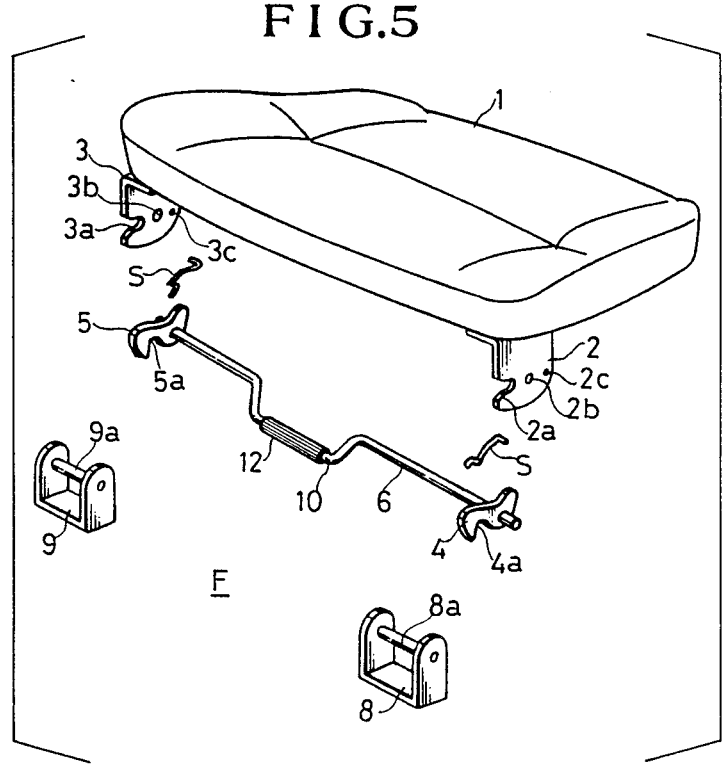
FIG. 5 is an exploded perspective view of the seat.

As shown in FIGS. 3 and 5, the lock members (4)(5) are normally biased by springs (S)(S), respectively, such as to forcibly cause their forward portions to rotate downwardly about the rotation point at (2b)(3b), to thereby bias the respective latch hook parts (4a)(5a) into a latching engagement on the connecting rod (6). At this point, it is seen that the handle portion (10) of the connecting rod (6) is positioned in a manner depending generally perpendicularly from the longitudinal axis of the connecting rod (6) per se.

The two springs (S)(S) are arranged between the support brackets (2)(3) and the lock members (4)(5), respectively, such that the one ends of the springs (S)(S) are fixed in the holes (2c)(3c) respectively of the support brackets, while the other ends of them are secured fitted over the lock members (4)(5), respectively. Preferably, the springs (S)(S) are bent generally in an inverted "V" shape as shown in FIG. 3 with a view to effectively biasing the lock members (4)(5) downwardly.

Figure 2:
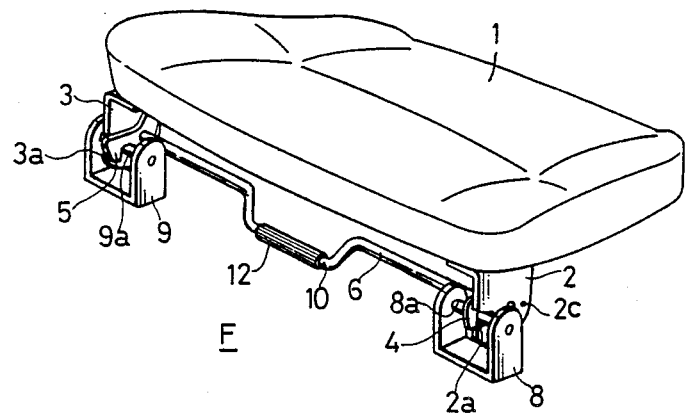
FIG. 2 is a perspective view of a vehiccle seat in accordance with the present invention, which shows the state wherein the seat is attached to base brackets one the floor.

Of course, as is apparent, FIGS. 2 and 3 show the state wherein the seat cushion (1) is attached to the base brackets (8)(9) via the above-mentioned support brackets (2)(3) and lock members (4)(5). Namely, the support pins (8a)(9a) of the base brackets (8)(9) are encircled by the latch hook parts (4a)(5a) of the lock members (4)(5) as well as the notched engagement recesses (2a)(3a) of the support brackets (2)(3), respectively, whereupon the seat cushion (1) is locked positively with regard to the floor (F), thus indicating the allowability for an occupant to sit thereon.

Now, a description will be made of the use of the above-described seat.

To remove the seat cushion (1) from the base brackets (8)(9), as shown in FIG. 3, the handle portion (10) of the connecting rod (6) is rotated upwardly by one hand of an operator in a direction forwardly of the seat cushion (1), as indicated by the arrow in FIG. 3, overcoming the downward biasing force of the springs (S)(S) associated with the lock members (4)(5). Simultaneously with such upward rotation of the connecting rod (6), the two lock members (4)(5) are caused to rotate upwardly in the arrow direction, with the result that the support pins (8a)(9a) are released from engagement with the latch hook parts (4a)(5a), opening the notched recesses (2a)(3a), which is indicative of permitting the support brackets (2)(3) to be disengaged away from the base brackets (8)(9). Then, as the handle portion (10) is rotated to a horizontal line, generally in parallel with the floor (F), the operator pushes or draws, with his or her same one hand, the handle portion (10) to move the seat cushion (1) in a rearward direction, as can be seen by the arrows in FIG. 4, at which moment, the engagement recesses (2a)(3a) are slided upon and disengaged out of the corresponding support pins (8a)(9a) of the base brackets (8)(9). Consequently, the operator lifts up the seat cushion (1) as he or she holds the handle portion (10) as it is, just as if to carry a bag in one hand, and remove the seat cushion (1) from the floor (F) for disposing of the same externally of the vehicle.

Reversely, when the removed seat back (1) is to be attached to the base brackets (8)(9), the operator has only to carry the seat back (1) in his or her one hand, holding the handle portion (10) with the same hand, and engaging the support pins (8a)(9a) of the base brackets (8)(9) into the corresponding engagement recesses (2a)(3a) of the support brackets (2)(3). At this state, it should be noted that the engagement recesses (2a)(3a) are in an opened state, allowing ready receipt of the support pins (8a)(9a), because the handle portion (10) has already been rotated up during operator's holding of the same, which retains the upwardly turned state of the lock members (4)(5) away from the engagement recesses (2a) (3a), thus not closing them.

Although not shown, a seat back may be connected with the rearward side of the seat cushion (1) via a hinge mechanism or may be mounted on a wall of cabin of the vehicle, so as to form a complete unit of seat in the vehicle.

From the above descriptions, it is well appreciated that (i) the formation of the crank-like handle portion (10) in the connecting rod (6) permits the seat cushion (1) to be easily removed from or secured on the floor (F) by one hand of the operator, which greatly simplifies the seat removal/mounting steps and further reduces the number of required parts since no such operation lever as in the prior art is needed in the present invention, and (ii) there is no projected element which projects externally of the seat, such as said operation lever, and thus eliminated is such damage of it or other peripheral objects as found in the prior art, which assures a safe structure in this kind of detachable seat.

While having described the invention as above, it should be understood that the invention is not limited to the illustrated embodiment, but any other modifications, replacements and additions may structurally be possible without departing from the spirits and scopes of the appended claims.

What is claimed is:

1. A vehicle seat comprising:
   a pair of base brackets fixed on the floor of the vehicle,
   a pair of support brackets fixed to opposite sides of a cushion,
   a pair or lock members,
   a transversely extending connecting rod rotatably journaled to the support brackets and fixedly connected at its end portions to the respective lock members, said connecting rod including a crank-like handle portion formed at an intermediate portion of the connecting rod and operable to disengage the lock members from the base brackets.

2. The vehicle seat as claimed in claim 1, wherein said crank-like handle portion is provided with a slippage-preventive cover.

3. The vehicle seat as claimed in claim 1, wherein, when said seat is in the locked state with regard to said floor, said crank-like handle portion is positioned in a manner depending generally perpendicularly from a longitudinal axis of said connecting rod, whereby rotating said crank-like handle portion from said perpendicular position to a horizontal line causes disengagement of said lock means out of said base bracket, thus releasing said locked state of said seat and permitting removal of said seat from said floor.

4. The vehicle seat as claimed in claim 1, wherein said pair brackets are fixed on the reverse side of said seat cushion such that they are disposed on respective both lateral sides of and forwardly of said seat cushion, wherein said pair of lock members are each provided inwardly of and adjacent to the respective two support brackets, wherein said pair of support brackets are each formed with an engagement recess at its forward edge, wherein said pair of lock members are each formed at its forward portion with a latch hook part and further are at their respective rearward portions fixed on said connecting rod, wherein both ends of said connecting rod are supported rotatably in said pair of support brackets, wherein said pair of lock members are normally biased by spring means in a direction in which their latch hook parts are engaged over said connecting rod, wherein said base bracket comprises a pair of base brackets which are disposed at point corresponding to that of said two support brackets, said pair of base brackets being each provided with a support pin, and wherein normally, said support pins of said base brackets are encircled by said two latch hook parts of said lock members as well as said two engagement recesses of said support brackets, to thereby lock said seat to said two base brackets on said floor, and when said crank-like handle portion of said connecting rod is rotated, said two latch hook parts of said lock members are caused to rotate about an axis of said connecting rod in a direction away from the respective said two support pins of said base brackets, thereby allowing sliding-out of said two engagement recesses from said support pins and thus removal of said seat cushion from said base brackets.

* * * * *